United States Patent
Kurittu

Patent Number: 5,843,316
Date of Patent: *Dec. 1, 1998

[54] METHOD OF SEPARATING SODIUM HYDROXIDE FROM WHITE LIQUOR OR POLYSULFIDE LIQUOR USING DIFFUSION DIALYSIS

[75] Inventor: Hannu Kurittu, Imatra, Finland

[73] Assignee: Enso-Gutzeit Oy, Imatra, Finland

[*] Notice: The term of this patent shall not extend beyond the expiration date of Pat. No. 5,510,035.

[21] Appl. No.: 805,588

[22] Filed: Feb. 25, 1997

Related U.S. Application Data

[63] Continuation of Ser. No. 324,522, Oct. 18, 1994, abandoned.

[30] Foreign Application Priority Data

Oct. 20, 1993 [FI] Finland ..................................... 934633

[51] Int. Cl.$^6$ ................................. C02F 1/44; C01D 7/32
[52] U.S. Cl. ........................ 210/644; 210/649; 162/30.11; 162/42; 162/50
[58] Field of Search ................................... 162/29, 30.11, 162/42, 50, 82, 90; 204/151, 182.4, 301; 210/644, 649, 651

[56] References Cited

U.S. PATENT DOCUMENTS

| | | | |
|---|---|---|---|
| 4,024,229 | 5/1977 | Smith et al. | 423/562 |
| 5,061,343 | 10/1991 | Azarniouch et al. | 162/16 |
| 5,326,433 | 7/1994 | Ryham et al. | 162/14 |
| 5,382,322 | 1/1995 | Magnotta et al. | 162/30.11 |
| 5,510,035 | 4/1996 | Toronen et al. | 210/644 |

FOREIGN PATENT DOCUMENTS

| | | |
|---|---|---|
| 83229128 | 12/1983 | Japan . |
| 326270 | 1/1972 | U.S.S.R. . |

OTHER PUBLICATIONS

Chemical Abstract, vol. 104, 1986, Abstract No. 52978.
Chemical Abstract, vol. 116, 1992, Abstract No. 135712.

*Primary Examiner*—Peter Chin
*Assistant Examiner*—Dean T. Nguyen
*Attorney, Agent, or Firm*—Nikaido, Marmelstein, Murray & Oram, LLP.

[57] ABSTRACT

The present invention relates to a method of processing white liquor obtained from the causticization stage of a pulp mill. According to the method, the white liquor, which principally contains sodium hydroxide (6) and sodium sulfide, is oxidized into polysulfide liquor (3), whereby the sodium sulfide is oxidized most advantageously with the help of a catalyst and an oxidizer such as air substantially into sodium polysulfide (7) and sodium thiosulfate. The method according to the invention is characterized in that the sodium hydroxide (6) contained in the white liquor is separated from the white liquor prior to the oxidizing step or from the polysulfide liquor (3) after the oxidizing step either entirely or partly by means of a diffusion dialysis process (4). The invention is further characterized in that the sodium hydroxide (6) separated from the white liquor is returned to the chemical circulation of the pulp mill.

18 Claims, 3 Drawing Sheets

METHOD OF SEPARATING SODIUM HYDROXIDE FROM WHITE LIQUOR OR POLYSULFIDE LIQUOR USING DIFFUSION DIALYSIS

This application is a continuation of application Ser. No. 08/324,522 filed Oct. 18, 1994, now abandoned.

The present invention relates to a method for producing sodium hydroxide from white liquor.

BACKGROUND OF THE INVENTION

The closed-cycle operation of the chemical cycles of a sulfate pulp mill is by no means a novel idea. However, trials in this direction have not gained wider practical application mostly due to the corrosion problems involved. Such drawbacks are related to the bleaching method employed based on the use of chlorine chemicals. Bleaching is a step of the operation of a pulp mill that has been resistant to closed-cycle operation of its chemical circulation. Efforts to lower the environmental pollution load are reflected in the pulp market in such a manner that presupposes abandoning the use of chlorine chemicals. This in turn has promoted the adoption of oxygen-, peroxide- and ozone-based bleaching processes. This processes consume even more purified NaOH than the conventional chlorine bleaching method. However, oxygen-peroxide bleaching methods allow closed-cycle operation of the bleaching stage chemical circulation, because the washing waters of the bleaching stage are free from chlorine compounds. It the chemical circulation is closed for the pulp bleaching stage, a situation will occur in which excess sodium accumulates in the chemical balance sheet. Removal of such excess from the chemical circulation is extremely difficult in practice. As to its chemical circulation, a conventional pulp mill (plant without the bleaching stage) operates in an auto-balance with respect to sodium and sulfur. Herein, the chemical losses of the pulping process can be compensated for by adding sodium sulfate to the soda furnace. To attain a balanced Na:S ratio also in the production of TCF (totally chlorine free) pulp, the NaOH required in the bleaching stage must be produced from the chemical circulation.

In the conventional, open bleaching process using a chlorine chemical for pulp bleaching, the alkaline extraction steps require 20–60 kg NaOH per ton of pulp. As the system is open, the same amount of NaOH will be lost with the washing waters in the plant sewer. The purified NaOH used as the make-up chemical is purchased from external suppliers. The commercial production of such purified sodium hydroxide is principally carried out according to the conventional methods described below;

The most common method of producing NaOH is electrolysis of sodium chloride. Basically it comprises decomposition of salt (NaCl) into its elemental constituents (Na) and ($Cl_2$). The separation of these two components from each other may in practice occur in two different ways. The older method is to use a so-called mercury cell formed by two parts: a primary cell and a secondary cell. The primary cell has a titanium anode (connected to the positive potential) on which chlorine gas, $Cl_2$, is formed and a mercury cathode (connected to the negative potential) on which the sodium formed amalgamates with mercury. The amalgam flows into the secondary cell where it is mixed with water, whereby the sodium of the amalgam reacts so as to form sodium hydroxide and hydrogen gas. The NaOH is recovered as a 50% aqueous solution. In the newer membrane cell, the anode and cathode spaces are separated from each other by an ion-selective membrane. The membrane is permeable to sodium ions only. Then, chlorine is formed at the anode, while sodium hydroxide and hydrogen are formed at the cathode. The sodium hydroxide is recovered as a 20% aqueous solution. For storage and transport, the solution is fortified by, evaporation to 50–60% concentration.

Another important method is the use of a separate caustic formation step in which NaOH is produced by the reaction:

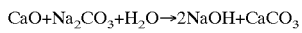

$CaO+Na_2CO_3+H_2O \rightarrow 2NaOH+CaCO_3$

Of other known production methods can be mentioned the decomposition of sodium sulfate by electric current into sodium hydroxide and sulfuric acid by means of a bipolar membrane technique. The products obtained from this process are NaOH of approx. 10% concentration and $H_2SO_4$ of 15% concentration. Furthermore, a production method must be mentioned in which NaOH can be produced within the chemical recovery cycle. Namely, NaOH may also be obtained by evaporation-crystallizing green liquor, whereby the $Na_2CO_3$ contained in the green liquor crystallized out and then converted into NaOH by a separate caustic formation step in accordance with conventional chemical recovery methods.

The greatest disadvantage of an open bleaching process is the loss of all consumed NaOH in the washing waters going to the plant's wastewater treatment system. A common drawback of all conventional methods is their high specific energy consumption which in the membrane method, for instance, is approx. 3.1 MWh electric energy per ton of 100% NaOH produced. The large amount of equivalent $Cl_2$ formed by the method presents a problem, because use of chlorine in pulp bleaching is becoming obsolete and replacing uses for the chlorine have not been found. Moreover, all above-mentioned methods share a common disadvantage of high investment costs. Particularly it must be noted that in the evaporation-crystallization method the purity of the NaOH obtained therefrom may cause problems.

OBJECTS AND BRIEF DESCRIPTION OF THE INVENTION

It is an object of the present invention to provide a system in which a required amount of white liquor can be side-streamed from the chemical circulation of the pulp mill for the production of purified NaOH for the needs of, e.g., the bleach plant thus requiring no purchase of caustic soda and providing a method of balancing the chemical recovery cycle.

According to the invention, a diffusion dialysis process can be employed for producing purified NaOH from the sidestream of the chemical circulation using polysulfide caustic as the feed liquor. When a sufficient amount of the polysulfide caustic is fed into the diffusion dialysis process, two fractions are obtained: a purified NaOH fraction and a polysulfide fraction. The first fraction can be used in, e.g., the bleaching stage, while the second fraction is passed to the cooking process. The function of the method according to the invention is essentially characterized by oxidization of white liquor into polysulfide caustic advantageously using a so-called MOXY process and subsequent treatment of the polysulfide caustic in accordance with the invention by diffusion dialysis to the end of separating NaOH from polysulfide caustic.

DETAILED DESCRIPTION OF THE INVENTION

The use of polysulfide (PS) in the pulp cooking process is an idea of about 50 years of age. The first patent was granted in 1943 (Fuller and Woodside) Their discovery was that higher yield of pulp from wood was achieved by adding elemental sulfur to white liquor so that polysulfide is formed. This method was not particularly practicable, because the addition of sulfur in the chemical circulation shifted the sulfur-to-sodium ratio excessively.

In 1974, Mead Corporation presented a white liquor oxidation process developed by the company in which sodium sulfide was converted into polysulfide with the help of an active coal catalyst and air. The method became known as the MOXY (Mead Oxidation) process. So far this is the only method of producing polysulfide that has gained commercial importance. The first MOXY process was started at Mead's Chillicothe plant in 1973. The first plant in Europe to use the process was Peterson & Son plant in Moss, Norway, starting from May 1976. The operating principle of the MOXY process is described in, e.g., U.S. Pat. No. 4,024,229.

Pulp manufacture by polysulfide cooking is a modification of the sulfate pulping process in such a manner that sodium polysulfide or elemental sulfur is added in the sulfate pulping liquor containing sodium hydroxide and sodium sulfide. The polysulfide reacts in the beginning of the cooking process with the polysaccharides of the wood by oxidizing the carbonyl terminal groups of the polysaccharides into carboxyl groups, whereby the polysaccharides become stabilized against alkaline decomposition. Thus, polysulfide pulping gives better yield than sulfate pulping. However, the addition of excess sulfur or polysulfide to the sulfate pulping process alters the relationship between sulfur and sodium in the chemical circulation and thus may cause chemical losses in chemical recovery. The ratio of sulfur to sodium may be kept unaltered if the added polysulfide can be produced from the sodium sulfide already contained in the white liquor of the sulfate pulping process.

The first step of the MOXY process comprises filtering the white liquor free from dregs (sediment) to the highest possible degree. This step serves for preventing the fouling of the activated coal catalyst. The filtration is performed using, e.g., an Eco filter. The filtered white liquor is pumped to the upper section of the reactor, into which air is also passed. The diameter and number of reactor towers is selected according to the required capacity. The most common tower diameters have been in the range 1.1–2.1 m with a tower height of approx. 10 m. For instance, a reactor with 2.1 m diameter provides an oxidation capacity of approx. 2800 m$^3$/d white liquor having a sulfide concentration of 30 g/l (as Na$_2$O). The catalyst contained in the reactor is divided into three separate layers to prevent formation of channels for the liquor and the air. The catalyst used is advantageously particulate activated carbon which is surface-treated with polytetrafluoroethylene to render the activated carbon water-repellent.

The oxidation of sodium sulfide occurs during the downward flow of air and white liquor through the catalyst layers. Air and polysulfide liquor (orange liquor) are passed out from the reactor to a settling tank. Air is therein separated from the liquor and passed out from the tank. The orange liquor is pumped to a storage tank.

Oxidation of sodium sulfide with air proceeds through the following reactions:

$$2Na_2S+O_2+2H_2O \rightarrow 2S+4NaOH \quad (1)$$

$$(X-I)S+2Na_2S \rightarrow Na_2S_x \quad (2)$$

$$2Na_2S+2O_2+H_2O \rightarrow Na_2S_2O_3+2NaOH \quad (3)$$

Reactions (1) and (2) describe the desirable formation of polysulfide, while reaction (3) represents a side reaction in which sodium thiosulfate and sodium hydroxide are formed. This reaction is desirable when the goal is to attain complete oxidation of the sodium sulfide contained in the white liquor into sodium thiosulfate and sodium hydroxide, and then to use the formed caustic in, e.g., the oxygen bleaching stage or a stack gas scrubber. Complete oxidation is called the MOXY-dizer process.

In the normal operation of the MOXY process, approx. 60% of sodium sulfide is oxidized and approx. 70% of the oxidized sodium sulfide is converted into sodium polysulfide.

Tables 1 and 2 give the values of typical effects of the MOXY and MOXY-dizer processes on the concentrations of Na chemicals in the white liquor.

TABLE 1

Effect of MOXY process on chemical concentrations

|  | White liquor [g/l, as Na$_2$O] | Polysulfide liquor |
|---|---|---|
| Na$_2$S | 35.0 | 14.0 |
| NaOH | 65.0 | 82.9 |
| Na$_2$CO$_3$ | 25.0 | 25.0 |
| Na$_2$S$_2$O$_3$ | 3.0 | 6.1 |
| Na$_2$S$_x$ (g/l, as sulfur) | 0 | 7.6 |
| Active alkali | 100.0 | 96.9 |
| Total alkali | 125.0 | 121.9 |

TABLE 2

Effect of MOXY-dizer process on chemical concentrations

|  | White liquor [g/l, as Na$_2$O] | Oxidized liquor |
|---|---|---|
| Na$_2$S | 35.0 | 0 |
| NaOH | 65.0 | 82.5 |
| Na$_2$CO$_3$ | 25.0 | 25.0 |
| Na$_2$S$_2$O$_3$ | 3.0 | 20.5 |

Aqueous solutions of sodium polysulfide contain different kinds of polysulfide ions such as S$_n$S$^{2-}$ as well as HS$^-$, S$^{2-}$ and OH$^-$ ions. In the aqueous solution these ions are in equilibrium:

$$S_m+_nS^{2-}+HS^-+OH^- \rightarrow S_mS^{2-}+S_nS^{2-}+H_2O$$

Plausibly, the polysulfide ions occur in the form of folded chains. It has been proven that a sulfur atom can form a linear bond with only two other sulfur atoms (—S—S—S—), and consequently, branched structures are not possible. Of the polysulfide ion species, S$_1$S$^{2-}$, S$_2$S$^{2-}$, S$_3$S$^{2-}$ and S$_4$S$^{2-}$ ions have been found to occur as crystalline Na and K salts. The entire series of corresponding acids have been isolated from H$_2$S$_1$S to R$_2$S$_7$S.

Several investigations into the oxidation of sulfide have been carried out for different applications. To stop the oxidation reaction at the polysulfide level requires a high degree of selectivity from the reaction arrangement. It should simultaneously be simple and economical to implement. Moreover, it must be noted that the sulfide of the white liquor as such is essentially resistant to oxidation with air, and consequently, yields thiosulfate instead of polysulfide as the oxidation result. By contrast, when white liquor in the oxidation with air is replaced by a mixture of white liquor and black liquor obtained as the waste liquor of sulfate pulping, polysulfide will form.

Summarizing the above-stated, the MOXY process is understood to possess the following benefits:

Yield is improved by 1.5–2% for softwood pulp and by 0.8–1.5% for hardwood pulp.

The sulfur-to-sodium ratio of the cooking liquor stays constant.

The cooking liquor is extremely pure with a solids content of less than 10 ppm. This is an important benefit in terms of a closed-cycle plant. Normally, process-disturbing components tend to become enriched in the chemical circulation of a closed-cycle system. In the BOXY process such undesirable component can be removed, which also guarantees fault-free operation of a diffusion dialysis process following the MOXY process.

Accumulation of impurities in liquor preheaters, digester, evaporation plant and bleach plant is reduced substantially.

Corrosion of digesters is reduced.

Releases of obnoxious sulfur compounds to the environment is reduced.

Black liquor discharged from the digester contains less sodium sulfide and more sodium hydroxide than the black liquor discharged from conventional sulfate pulping.

The loading of the soda furnace is reduced as the black liquor contains less organic matter.

The process does not require separate operating personnel.

The process converts the sulfur compounds contained in the cooking liquor into more desirable form as compared to the diffusion dialysis process, that is, the efficiency of sulfur separation is improved substantially.

As the amount of process-disturbing metal compounds in the polysulfide liquor is essentially lower than in conventional white liquor, the possibility of such metal compounds binding with the fiber is essentially reduced. Hence, the decomposition rate of peroxide in the bleaching stage is lowered thus requiring less peroxide as well as less complexing agents in the bleaching process. Pitch and resin problems are also alleviated, because the calcium ion concentration of the polysulfide cooking liquor is extremely low.

Dialysis is a known membrane process suited for separation of compounds of small molecule size from a feed solution. It has been widely applied among other things to regeneration of NaOH in the polymer fiber industry and in medicine to the treatment of patients with renal disorder. The driving force in dialysis is the concentration difference across a semipermeable membrane. The separation efficiency of different compounds is dependent on the molecular size of the compounds and pore size of the membrane employed.

In the method according to the invention based on the use of a diffusion dialysis process, the separation efficiency of compounds is not dependent on the membrane pore size, but rather, on the permanent charge density of the matrix polymer of the membrane. Diffusion dialysis employs ion-exchange membranes fabricated to have either an anionic character (positive charge) or a cationic character (negative charge). If a cationic ion-exchange membrane is used in the diffusion dialysis process, the production of NaOH from alkaline solutions is possible according to the invention. A cationic membrane (with negative charge) favours permeation of monovalent cations through the membrane. The permeability of the membrane to different cations is dependent on their charge and ionic radius. Since the dominating cation in polysulfide liquor is sodium, the membrane is particularly selective to this ion species. With regard to anions, it can be noted that a cationic membrane forms a relatively effective barrier to all other anions except the $OH^-$ ion. When this property is combined with the conversion of the sodium sulfide of the white liquor by means of the MOXY process into polysulfide ions (that is, the ionic radius is increased, whereby the diffusion rate of the ion through the membrane is decreased), also the selectivity of the membrane to sulfur compounds is substantially improved.

Summarizing the above-stated, the diffusion dialysis process according to the invention is understood to possess the following benefits:

The diffusion dialysis process itself consumes no energy. Pumping of liquids to the dialysis process constitutes the only point requiring external energy input to the dialysis system, however, at a relatively low level as the diffusion dialysis cells of the system operate at atmospheric pressure.

The headroom of the process is small.

The diffusion dialysis process is flexible permitting easy capacity expansion or reduction of the equipment according to the chemical needs of the cooking and bleach plants.

The diffusion dialysis process is capable of producing all NaOH required in bleaching stage of a pulp mill without disturbing the Na:S ratio of the chemical circulation. A precondition to this is that the pulp mill is operated in closed-cycle fashion also for the bleaching stage.

The diffusion dialysis process is easy to design so as to dispose of the need for separate operating personnel.

When using polysulfide liquor as the infeed, contamination of the membranes of the diffusion dialysis cell is avoided as the MOXY process removes process-disturbing elements from the infeed liquor.

With polysulfide liquor as the infeed, the diffusion dialysis process provides an NaOH outlet solution of extremely low-sulfur content (less than 0.5 g/l). The sulfur passing through the membrane is already in oxidized form consisting of small molecule size polysulfide and $SO_4^{2-}$ ions. Such a caustic is readily suited for use in the bleaching stage as such.

As the polysulfide ions are capable of binding more $OH^-$ ions than dissociated $Na_2S$, the diffusion dialysis process provides the polysulfide outlet fraction with a directly usable concentration, that is, admixing the fraction with the cooking liquor has an insignificant effect on the liquid-to-wood ratio of the cooking process.

The caustic obtained from the dialysis process is entirely free from compounds of metals (Fe, Mn, Co, Ni, etc.) that are detrimental to the bleaching process.

BRIEF DESCRIPTION OF DRAWING

The invention is next examined in greater detail on the basis of comparative tests performed in laboratory scale with reference to the appended drawings, in which:

With reference to FIGS. 1 and 2, an embodiment of the method and equipment according to the invention is shown comprising a membrane pack of cationic membranes (4), feed pumps for water (5) and white liquor (3), and infeed and end product tanks. The membrane pack comprises a required number of cationic membranes (4) which are selectively permeable to cations.

Figure 1:
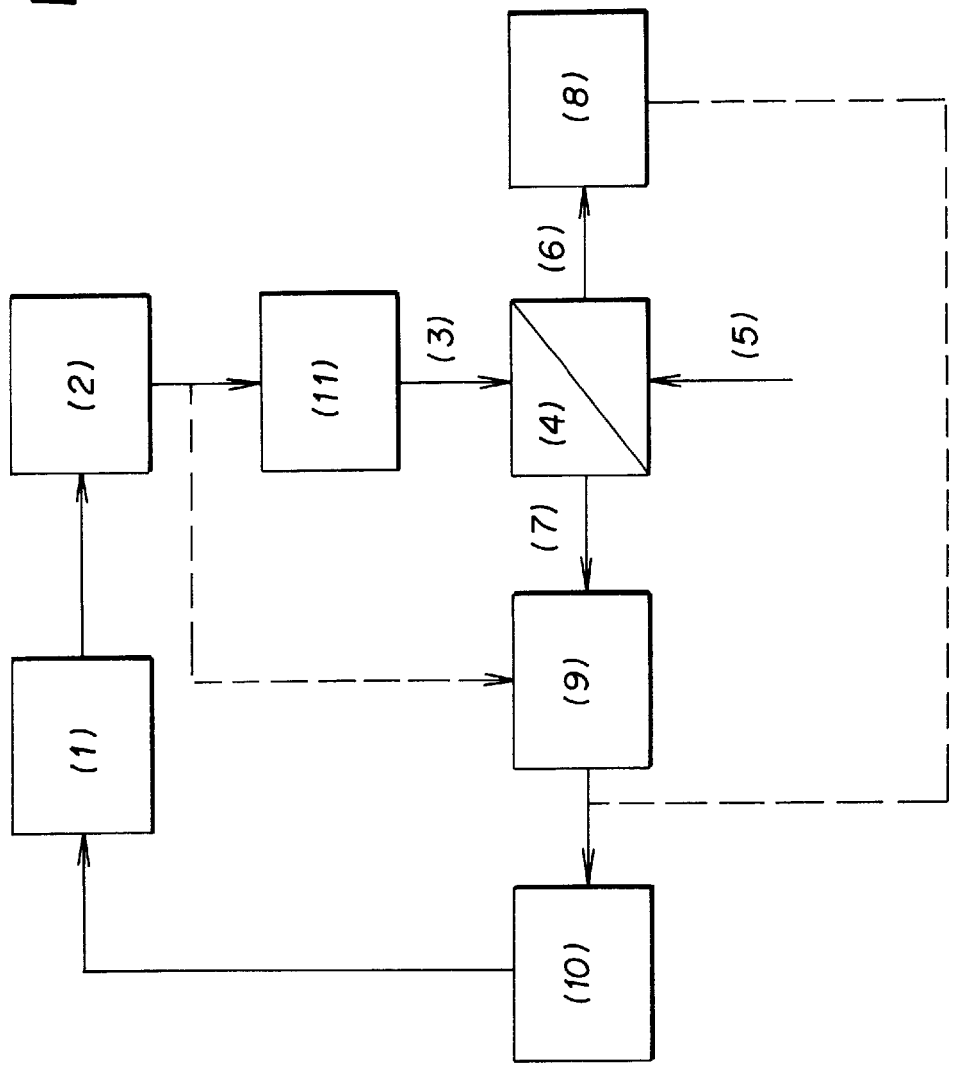
FIG. 1 is a flowsheet of an embodiment of the process according to the invention.
Figure 2:
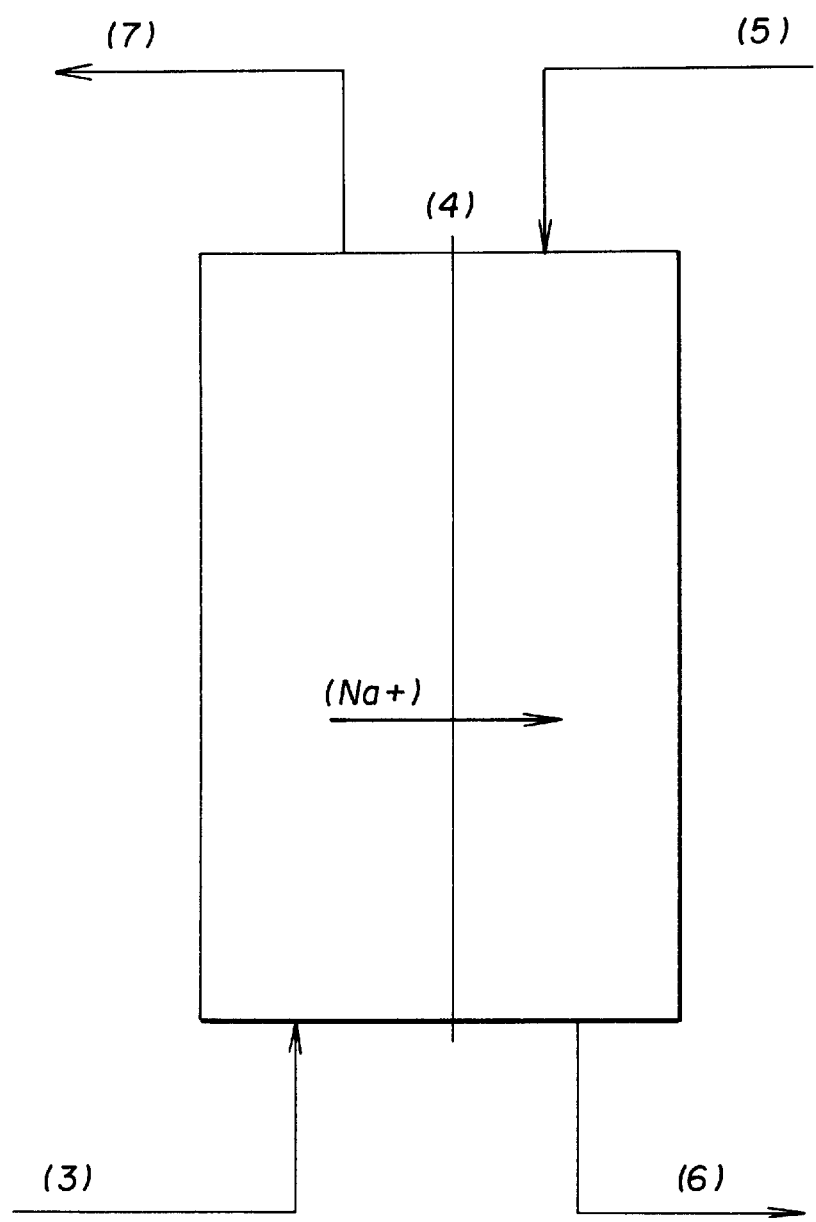
FIG. 2 is a schematic diagram of diffusion dialysis equipment suited for implementing the method illustrated in FIG. 1.

The basic component of the diffusion dialysis process equipment is the membrane pack. The membranes with a surface area of approx. 1 m² each are stacked into a membrane pack comprising approx. 200 pcs. of separate membranes. According to the required capacity of the dialysis equipment, a number of such membrane packs are assembled into a parallel-operated entity held together by means of, e.g., a hydraulic press. The test equipment employed was a DD pilot system TDS-2 manufactured by the Eurodia Company using NEOSEPTA CMA membranes by Tokuyma SODA Co. as the cationic membrane.

According to the invention, a sidestream of required amount of white liquor is taken after the causticization step (2), oxidized preferably using the above-described NOXY process and fed into the diffusion dialysis cell. Water is pumped to the cell countercurrently. The obtained purified NaOH fraction (6) is advantageously returned to the bleaching stage (8). Correspondingly, the polysulfide fraction (7) is most preferably returned to the digester (9) and therefrom further to the soda furnace (1). In this fashion, both fractions are returned after the evaporation step (10) back to the chemical circulation. The process is advantageously operated countercurrently, whereby water (5) is passed into the membrane pack from above and the polysulfide liquor (3) from below. The sodium ions (Na$^+$) of the polysulfide liquor (3) are transported by diffusion through the cationic membrane (4) to the water stream (5), whereas the NaOH fraction (6) is passed out from the process from below. Simultaneously, the sodium polysulfide (7) of the polysulfide liquor (3) remains in the feed stream and is passed out from the process via the top of the membrane pack.

Figure 3:
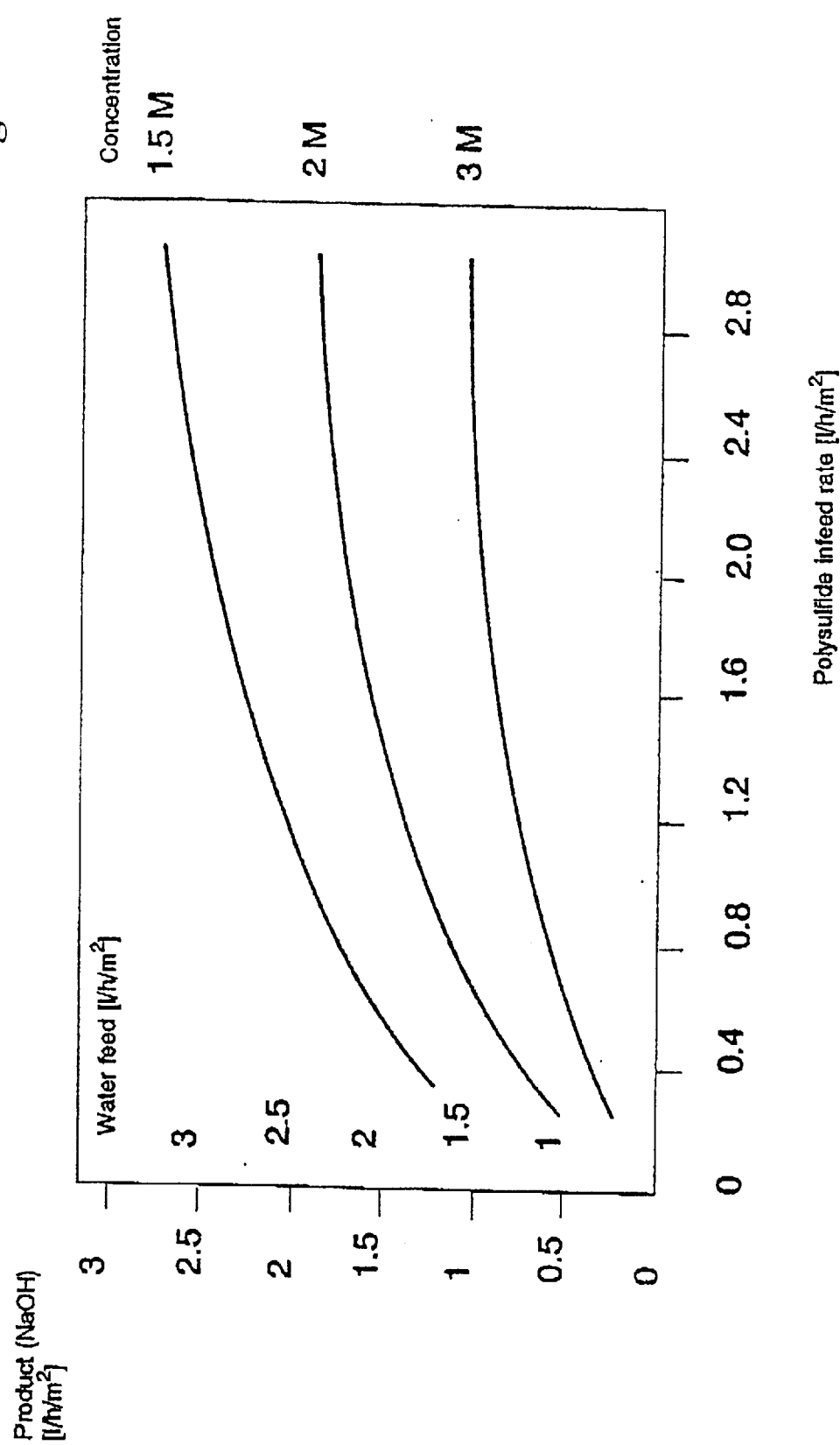
FIG. 3 shows the relationship of end product concentrations and volumes as a function of the infeed volume rate.

The results of the laboratory tests with different polysulfide liquor infeed volume rates are given in Table 3. Run-time parameter graphs computed on the basis of the tabulated test data are shown in FIG. 3, where the obtained end product concentrations and volumes are plotted as a function of the infeed volume rate. The results indicate that the process operates reliably in the fashion required by the invention. Given in Appendix 1 is the mass balance sheet, computed on the basis of the results from laboratory tests performed using the method according to the invention, for a paper mill producing 500,000 t of pulp per annum at a chemical consumption level of 30 kg NaOH/t pulp. The operating temperature of the dialysis process is approx. 20–25° C. Run-time control of the quantity and concentration of the two fractions, the purified NaOH fraction and the polysulfide fraction which are obtained by the diffusion dialysis process according to the invention, is possible by way of adjusting the relationship of the chemical indeed and water volume pumping rates, cf. Table 4. The test results indicate that the optimum results for the desired end product (NaOH) are obtained in conditions having the ratio of polysulfide liquor infeed rate to water pumping rate adjusted to approx. 1:1.1. Then, the end product is obtained at a rate of 0.85 l/hm² with 3M Molar concentration. The required membrane surface for each case can be computed from these end product rate values.

The invention further concerns the use of diffusion dialysis to the end of separating sodium hydroxide from white liquor, or advantageously, from polysulfide liquor advantageously obtained from the white liquor by means of catalytic and oxidizing conversion.

To those versed in the art it is obvious that the different applications of the invention are not limited to the preferred embodiments described above, but rather, can be varied within the scope of the invention which is defined in the appended claims.

TABLE 3

| Flow rates [l/h] | Product | | | | | | INFEED | | PRODUCT (NaOH) | | | Waste (polysulf.) | |
| --- | --- | --- | --- | --- | --- | --- | --- | --- | --- | --- | --- | --- | --- |
| (WL, white liquor) | NaOH | Waste | Water | | Ratio | NaOH | Polysulf. | NaOH | Polysulf. | S | NaOH | Polysulf. |
| [l/h] | [l/h/m²] | [l/h] | [l/h] | [l/h] | [l/h/m²] | Water/WL | [g/l] | [g/h] | [g/l] | [g/l] | [g/l] | [g/l] | [g/l] |
| 0.524 | 1.31 | 0.556 | 0.688 | 0.720 | 1.80 | 1.37 | 127.44 | 7.09 | 78.64 | 0.17 | 1.64 | 33.92 | 4.27 |
| 0.494 | 1.24 | 0.339 | 0.615 | 0.460 | 1.15 | 0.93 | 125.94 | 5.15 | 115.2 | 0.22 | 5.60 | 44.8 | 2.61 |
| 0.479 | 1.20 | 0.688 | 0.675 | 0.884 | 2.21 | 1.85 | 131.92 | 6.4 | 70.47 | 0.04 | 1.35 | 20.83 | 1.89 |
| 0.51 | 1.28 | 0.959 | 0.765 | 1.214 | 3.04 | 2.38 | 119.62 | 6.65 | 55.46 | 0.12 | 0.99 | 23.74 | 1.54 |
| 0.62 | 1.55 | 0.334 | 0.748 | 0.462 | 1.16 | 0.75 | 118.46 | 5.25 | 120.35 | 0.12 | 3.14 | 52.1 | 3.62 |
| 0.659 | 1.85 | 0.694 | 0.839 | 0.874 | 2.18 | 1.33 | 117.72 | 5.51 | 74.91 | 0.03 | 1.34 | 38.17 | 2.72 |
| 0.692 | 1.73 | 0.947 | 0.918 | 1.173 | 2.93 | 1.70 | 117.79 | 4.02 | 58.7 | 0.14 | 1.01 | 36.08 | 1.59 |
| 0.77 | 1.93 | 0.323 | 0.907 | 0.460 | 1.15 | 0.60 | 130.89 | 5.19 | 118.43 | 0.18 | 3.17 | 70.63 | 4.6 |
| 0.78 | 1.95 | 0.677 | 0.946 | 0.843 | 2.11 | 1.08 | 117.42 | 4.08 | 70.21 | 0.08 | 1.15 | 56.57 | 2.98 |
| 0.711 | 1.78 | 0.915 | 0.914 | 1.118 | 2.80 | 1.57 | 130.74 | 5.1 | 53.66 | 0.26 | 0.82 | 48.49 | 3.13 |

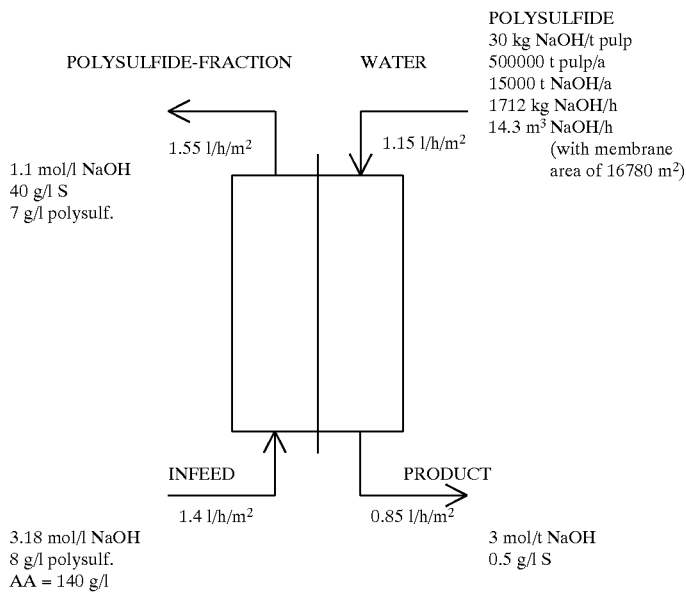

Appendix 1

I claim:

1. A method of separating sodium hydroxide from white liquor, or from polysulfide liquor obtained by oxidizing white liquor, which comprises subjecting said white liquor or said polysulfide liquor to diffusion dialysis using a cationic ion exchange membrane under conditions at which sodium hydroxide is separated from said liquor.

2. A method of processing a circulating aqueous liquor, containing sodium hydroxide and sodium sulfide, which liquor has been obtained from a caustic treating step of a pulping process, comprising:

passing said aqueous liquor containing sodium hydroxide through a diffusion dialysis process using a cationic ion exchange membrane under conditions sufficient to separate sodium hydroxide from said aqueous liquor and to produce a leaner aqueous liquor diminished in sodium hydroxide;

recovering separated sodium hydroxide; and then oxidizing said leaner aqueous liquor under conditions sufficient to convert sulfide to polysulfide.

3. A method as defined in claim 2 wherein substantially all of the sodium hydroxide separated from the aqueous liquor is returned back to chemical circulation of the pulping process.

4. A method as defined in claim 2 wherein sodium hydroxide (6) separated from the aqueous liquor is at least partly returned to a bleaching stage of the pulping process of the pulp mill.

5. A method as defined in claim 2 wherein the polysulfide is at least partly returned back to chemical circulation of the pulping process.

6. A method as defined in claim 2 wherein the amount of the sodium hydroxide separated from said aqueous liquor by said diffusion dialysis process is about 50–100% of the total content of sodium hydroxide contained in said aqueous liquor.

7. A method as defined in claim 2 wherein the concentration of the sodium hydroxide separated from said aqueous liquor by means of said diffusion dialysis process is about 0.5–3.0 mol/l.

8. The method as claimed in claim 2 wherein said aqueous liquor is white liquor.

9. The method as claimed in claim 2 wherein said oxidation is carried out with air in the presence of a catalyst.

10. The method as defined in claim 2 wherein the sodium hydroxide separated from the aqueous liquor is at least partly returned to a stack gas scrubbing stage of the pulping process.

11. The method as defined in claim 2 wherein the sodium hydroxide separated from the aqueous liquor is at least partly returned to a pulping process stage herein sodium hypochlorite is produced.

12. The method as defined in claim 2 wherein at least part of the polysulfide liquor produced by said oxidation is returned back to a pulping stage portion of the chemical circulation of the pulping process.

13. The method of processing an aqueous liquor, containing sodium hydroxide and sodium sulfide, obtained from a caustic treating step of a pulping process, comprising:

oxidizing said aqueous liquor under conditions sufficient to obtain an oxidized aqueous product comprising polysulfide and sodium hydroxide;

passing said oxidized aqueous product through a diffusion dialysis process using a cationic ion exchange membrane whereby separating at least part of said sodium hydroxide from said oxidized aqueous product; and recovering said separated sodium hydroxide.

14. The method as claimed in claim 13 wherein said aqueous liquor is white liquor.

15. The method as claimed in claim 13 wherein said oxidation is carried out with air in the presence of a catalyst.

16. The method as defined in claim 15 wherein the amount of the sodium hydroxide separated from said liquor, by feeding liquor comprising polysulfide to said diffusion dialysis process, is about 30–70% of the total amount of sodium hydroxide contained in the liquor comprising polysulfide.

17. The method as defined in claim 15, wherein the concentration of the sodium hydroxide separated by means of said diffusion dialysis process from said liquor comprising polysulfide is about 0.5–3.0 mol/1.

18. A method of treating an aqueous liquor, containing sodium hydroxide and sodium sulfide, to obtain sodium hydroxide and polysulfide therefrom, which aqueous liquor has been obtained from a caustic treating step of a pulping process, comprising:

passing a first aqueous liquor containing sodium hydroxide through a diffusion dialysis process using a cationic ion exchange membrane to separate sodium hydroxide therefrom and forming a second aqueous liquor containing sodium sulfide;

oxidizing said second aqueous liquor containing sodium sulfide to convert sodium sulfide to sodium polysulfide; and recovering, respectively, said sodium hydroxide and said sodium polysulfide.

* * * * *